Jan. 9, 1968  G. SESSING  3,362,509

HYDRAULIC BRAKE MECHANISM

Filed Oct. 18, 1965

INVENTOR.
GUNNAR SESSING

United States Patent Office 3,362,509
Patented Jan. 9, 1968

3,362,509
HYDRAULIC BRAKE MECHANISM
Gunnar Sessing, 20533 Madison St.,
Torrance, Calif. 90503
Filed Oct. 18, 1965, Ser. No. 497,491
7 Claims. (Cl. 188—90)

ABSTRACT OF THE DISCLOSURE

As the foot brake pedal of a car, that is traveling on a road, is depressed the pumping action of the master brake cylinder forces the brake fluid through tube 15 into chamber 14, which also is full of fluid, creating a pressure against piston(s) 7, which is in rotation with housing 4, axle 5 and wheel 6. Piston 7, which ordinarily is held in a neutral or inactive position with a spring, is then forced into fluid column 1, but since the fluid column cannot rotate its fluid must always flow past piston 7, and then through a smaller and smaller opening as the pressure is increased thus hindering the rotation of wheel 6 by a greater and greater force until finally it must stop where the piston is at its extreme inward position closing the opening completely. As seen in FIG. 2 all shafts 11 except one are always blocking the rotative movement of fluid column 1 as a unit.

---

My invention relates to a hydraulic brake mechanism that is broadly applicable to all forms of rotatable machinery requiring a brake; but for purpose of illustration I have here described it as applicable to an automobile.

The object of my invention is to produce a brake that is efficient, durable, simple, and cheap of construction.

Figure 1:
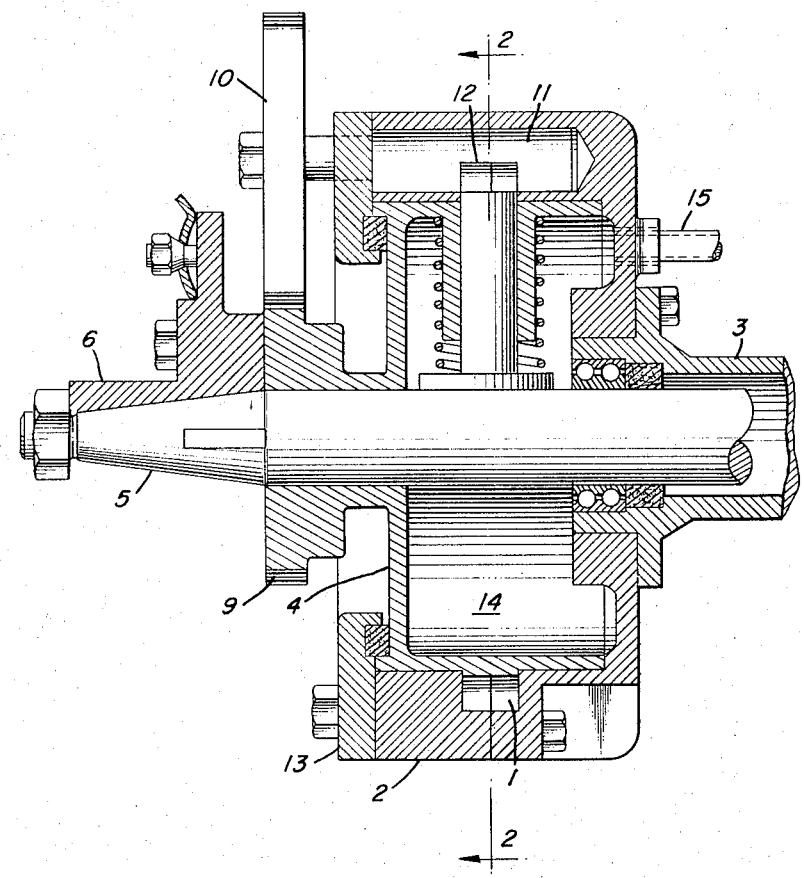
Figure 2:
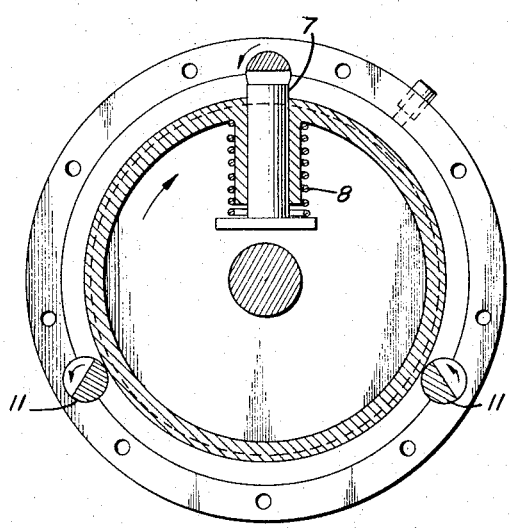

I attain these, and other objects that are inherent to my invention, by the mechanism illustrated in the accompanying drawing in which FIG. 1 is a longitudinal sectional view showing the brake mounted on a car axle close to the wheel; and FIG. 2 is a sectional end view through the piston.

The hydraulic brake consists of a non-rotatable ring shaped column of fluid 1 of rectangular cross section; enclosed on three sides by non-rotatable outer housing 2, which is attached to axle tube 3 of a car; and is enclosed on the fourth and inner side by rotatable piston housing 4, which is attached to wheel axle 5 and wheel 6 of the car. Piston housing 4 is provided with (one or more) piston 7, which can by force be pushed into fluid column 1; and spring 8, which always keeps piston 7 in the inactive or neutral position when no force is applied.

As seen in FIGS. 1 and 2 gear 9, which is part of piston housing 4, is in mesh with gear 10 (three shown, but can be another number), whose shafts 11 rotate in outer housing 2. Gears 9 and 10 have the same number of teeth. Idler gears could also be added between gears 9 and 10, or shafts 11 could be driven by sprocket and chain arrangement instead of gears. Every shaft 11 has a cut-out 12 on one side up to its center to a length equal to the width of fluid column 1 so as to permit piston 7 to pass shafts 11 without metal interference. Shafts 11 are held in place by retainer 13, which also serves as an oil seal.

Around car axle 5, and between piston housing 4 and outer housing 2 is located inside fluid pressure chamber 14 into which leads fluid inlet pressure tube 15 from the car's master brake cylinder.

As variations and modifications may be desirable, and may be made without departing from the features of my invention, I do not wish to limit myself to the exact construction and arrangement shown and described, but reserve the right to all variations and modifications that do not extend beyond the terms of the claims hereinafter set forth.

What I claim is:
1. In a hydraulic brake mechanism the combination of a stationary housing containing a plurality of rotatable shafts, a rotatable housing containing one or more movable pistons, an endless ring shaped fluid column enclosed between said housings, said shafts being geared to and rotatable in harmony with said rotatable housing and having an eccentric shape at the intersection of said fluid column so as to allow said movable pistons in said rotatable housing to travel through said fluid column without non-fluid interference and also to hold said fluid column stationary with said stationary housing, and power means to force said movable pistons into said fluid column to hinder and stop the rotation of said rotatable housing.

2. In a hydraulic brake mechanism the combination of a rotatable member containing movable means, a stationary housing containing an endless ring shaped fluid column, rotatable elements in said stationary housing geared to and rotatable in harmony with said rotatable member, said rotatable elements extruding through said fluid column for the purpose of holding it stationary with said stationary housing, said rotatable elements eccentrically shaped at said fluid column so as to allow said movable means in said rotatable member to travel through said fluid column without non-fluid interference, and power means to force said movable means into said fluid column to hinder and stop the rotation of said rotatable member.

3. In a hydraulic brake mechanism the combination of a rotatable housing containing one or more movable pistons that are held in a neutral or inactive position by spring arrangement, a stationary housing containing one or more shafts geared to and rotatable in harmony with said rotatable housing, a non-rotatable endless fluid column enclosed between said housing, said shafts having an eccentric shape at the intersection of said fluid column so as to allow said rotatable housing with said pistons to rotate without non-fluid interference, and power means for forcing said pistons into said fluid column to hinder and stop the rotation of said rotatable housing.

4. In a hydraulic brake mechanism the combination of a rotatable member containing one or more movable means, a stationary housing containing an endless ring shaped fluid column of equal cross sectional area all around and also containing rotatable elements geared to and rotatable in harmony with said rotatable member, said elements having an eccentric shape at the intersection of said fluid column so as to allow said movable means in said rotatable member to travel through said fluid column without metal interference and also to hold said fluid column stationary with said stationary housing, and power means to force said movable means into said fluid column to hinder and stop the rotation of said rotatable member.

5. In a hydraulic brake mechanism the combination of a stationary housing containing a stationary endless ring shaped fluid column of equal cross sectional area all around, a rotatable member containing movable means, rotatable elements in said stationary housing geared to and rotatable in harmony with said rotatable member, said elements eccentrically shaped at the intersection of said fluid column so as to allow said movable means in said rotatable member to travel through said fluid column without metal interference, and power means to force said movable means into said fluid column to hinder and stop the rotation of said rotatable housing.

6. In a hydraulic brake mechanism the combination of a rotatable housing containing a movable piston, a stationary housing containing shafts geared to and rotatable in harmony with said rotatable housing, an endless ring shaped fluid column between said housings intersecting said shafts so as to be held stationary with said stationary housing, said shafts eccentrically shaped at the intersections of said fluid column so as to allow said movable piston in said rotatable housing to travel through said fluid column without metal interference, and power means to force said movable piston into said fluid column so as to hinder and stop the rotation of said rotatable housing.

7. In a hydraulic brake mechanism the combination of a rotatable member containing movable means that are held in a neutral or inactive position by spring arrangement, a stationary housing containing a stationary endless ring shaped fluid column and also a plurality of rotatable elements geared to and rotatable in harmony with said rotatable member, said elements extending through said fluid column and having there an eccentric shape so as to allow said movable means in said rotatable member to travel through said fluid column without metal interference, and power means to force said movable means into said fluid column to hinder and stop the rotation of said member.

References Cited
UNITED STATES PATENTS

| | | | |
|---|---|---|---|
| 1,599,439 | 9/1926 | Staude | 188—90 |
| 2,790,519 | 4/1957 | Crankshaw | 188—90 |
| 3,010,545 | 11/1961 | Young | 188—90 |

MILTON BUCHLER, *Primary Examiner.*

G. E. A. HALVOSA, *Assistant Examiner.*